United States Patent [19]
Gallo

[11] 3,957,083
[45] May 18, 1976

[54] PRESSURE SENSITIVE REGULATING VALVE

[75] Inventor: Elia A. Gallo, League City, Tex.

[73] Assignee: The United States of America as represented by the Secretary of the Air Force, Washington, D.C.

[22] Filed: Jan. 27, 1975

[21] Appl. No.: 544,457

[52] U.S. Cl.................................. 138/43; 137/517; 251/DIG. 3
[51] Int. Cl.² ........................................ F16K 15/14
[58] Field of Search................ 251/DIG. 3; 137/517, 137/525; 138/43, 46, 44, 45

[56] References Cited
UNITED STATES PATENTS

| | | | |
|---|---|---|---|
| 1,079,985 | 12/1913 | Kaminsky | 251/DIG. 3 |
| 1,395,932 | 11/1921 | Staude | 251/DIG. 3 |
| 2,362,232 | 11/1944 | Anschicks | 251/DIG. 3 |
| 3,703,913 | 11/1972 | Carsten | 137/517 X |

FOREIGN PATENTS OR APPLICATIONS

| | | | |
|---|---|---|---|
| 1,195,460 | 5/1959 | France | 251/DIG. 3 |
| 2,051,855 | 4/1971 | Germany | 251/DIG. 3 |
| 1,646 | 12/1877 | Germany | 251/DIG. 3 |

Primary Examiner—Robert G. Nilson
Attorney, Agent, or Firm—Joseph E. Rusz; Jacob N. Erlich

[57] ABSTRACT

A pressure sensitive regulating valve formed of a spring mounted within a conduit in which fluid flow is to be regulated. The fluid flow is regulated by the pressure responsive expansion and contraction of the axially deformable spring whose successive convolutions alternately increase and decrease the free-flow volume of the space surrounding the spring as the spring responds to alternate increases and decreases of pressure exerted thereon.

3 Claims, 6 Drawing Figures

PRESSURE SENSITIVE REGULATING VALVE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to flow control devices, and, more particularly to a pressure sensitive regulating valve.

In the field of rocketry or any other area which undergoes a great variance in pressure, it is essential to provide flow control devices which are not only sensitive to these changes in pressure but is also extremely reliable in action. Heretofore the valves which were used in these areas were complex in nature, relatively expensive to produce and because of their complexity, in many instances, failed during operation.

There are many instances in which a reliable flow regulator is essential, for example, one such instance is in certain gas turbine engine applications, such as ground-to-air missiles. With this type of missile the engine is started and brought up to maximum speed on the ground by the use of auxiliary equipment that is disconnected before the missile is launched. The missile fuel system may be very simple as compared to the auxiliary equipment; for example, it may comprise merely of a pressurized fuel tank mounted near the front of the engine and an inexpensive, slow reacting, pressure responsive governor located just upstream of the nozzle that discharges fuel into the engine burner chamber which is at the ambient pressure. While it is desired to maintain the fuel flow to the engine constant once the missile is launched, the missile is accelerated throughout its mission and any "G" loading in fuel lines parallel to the direction of flight causes an excessive fuel supply that may cause the engine to overspeed and overheat. It is in this area in which a reliable pressure sensitive regulating valve becomes necessary.

Another example in which such a pressure dependent valve is essential, is in the transpiration cooling of a re-entry vehicle which is accomplished by forcing a coolant through the nose of the vehicle in quantities adequate to maintain nose temperatures within an acceptable range. The amount of coolant required is a function of the aerodynamic heating encountered. In order to keep the quantity of coolant carried and the size and weight of the expulsion system low, a means of controlling the flow to match the requirements is necessary. Since the aerodynamic heating of the vehicle is caused by the compression of the atmosphere ahead of the vehicle, it is obvious that there will be a correlation between the heating rate and the deceleration of the vehicle which is a result of the pressure force thereon. This deceleration is sensed by a pressure sensitive valve which meters a predetermined flow to the nose.

Heretofore, means of flow control resulted in prohibitive quantities of coolant or fuel to be carried in the vehicle as well as constant malfunction during critical stages of operation.

SUMMARY OF THE INVENTION

The instant invention sets forth a pressure sensitive regulating valve which is not only inexpensive to produce but is also extremely reliable in operation since it relies upon only a single element for its regulating capacity.

The flow regulating valve of this invention is in the form of either a conical or helical spring which may have mounted thereon a baffle. This spring is fixedly secured within the line in which the fluid flow is to be regulated. By precisely defining the parameters of the spring during manufacture thereof, a variety of differential pressures may be accommodated by the regulator or valve of this invention.

In operation the spring making up the instant valve is either compressed or extended until it generates a new Force required to counteract a new $\Delta P$ and to reestablish equilibrium within the system. It is this axial motion of the spring either decreasing or increasing the flow area that creates the regulating action. The design characteristics of the spring during manufacture are of prime importance because they, and they alone determine the degree and the accuracy of the regulating action.

It is therefore an object of the invention to provide a pressure sensitive regulating valve which is extremely simple in design and highly reliable in operation.

It is another object of this invention to provide a pressure sensitive regulating valve which is economical to produce and which utilizes conventional currently available components that lend themselves to standard mass producing manufacturing techniques.

For a better understanding of the present invention together with other and further objects thereof reference is made to the following description taken in conjunction with the accompanying drawing and its scope will be pointed out in the appended claims.

DETAILED DESCRIPTION OF THE PREFERRED EMBODIMENT

Figure 1:
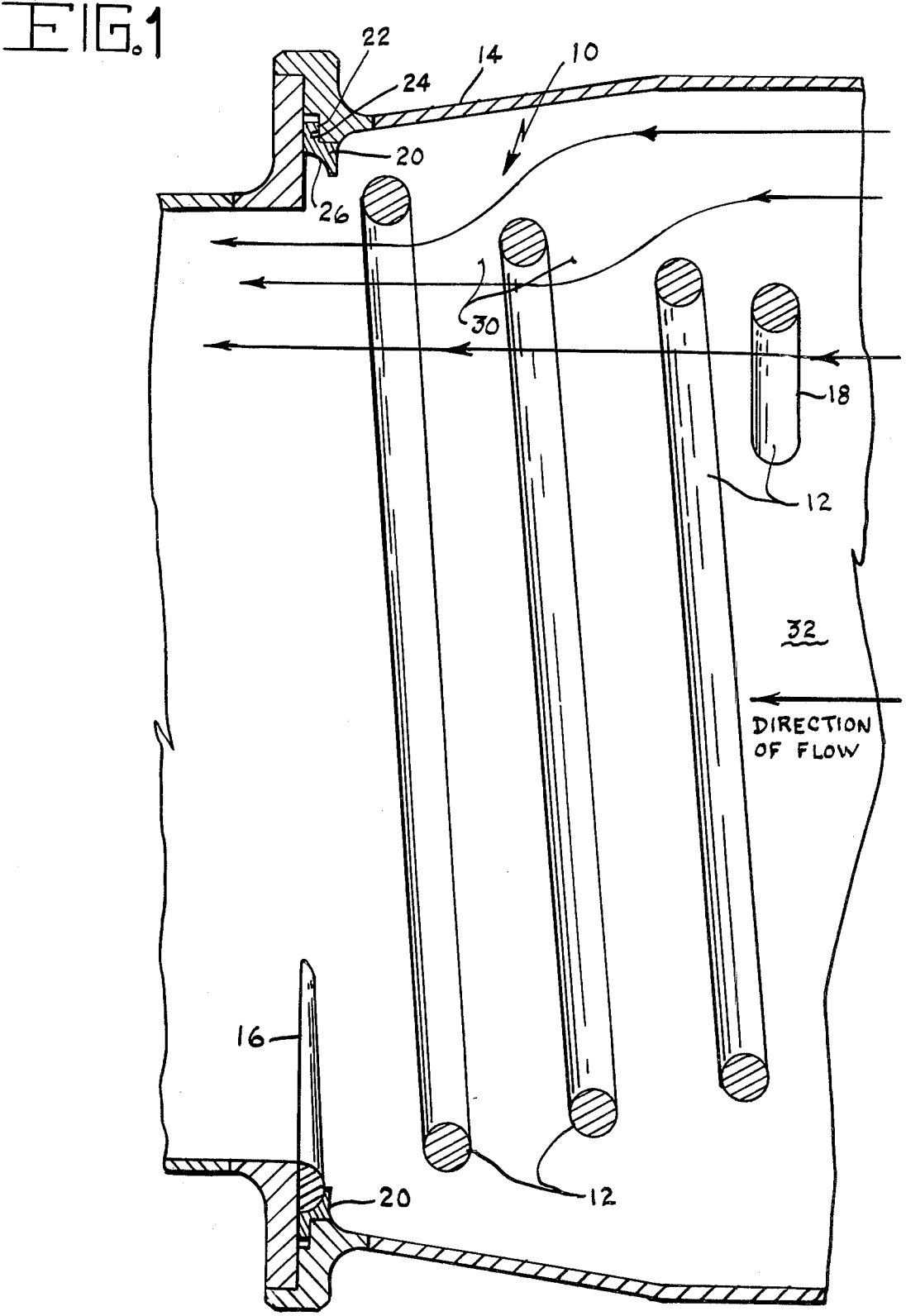
FIG. 1 represents a side elevational view of the conical spring flow regulator valve of this invention showing maximum flow area.
Figure 2:
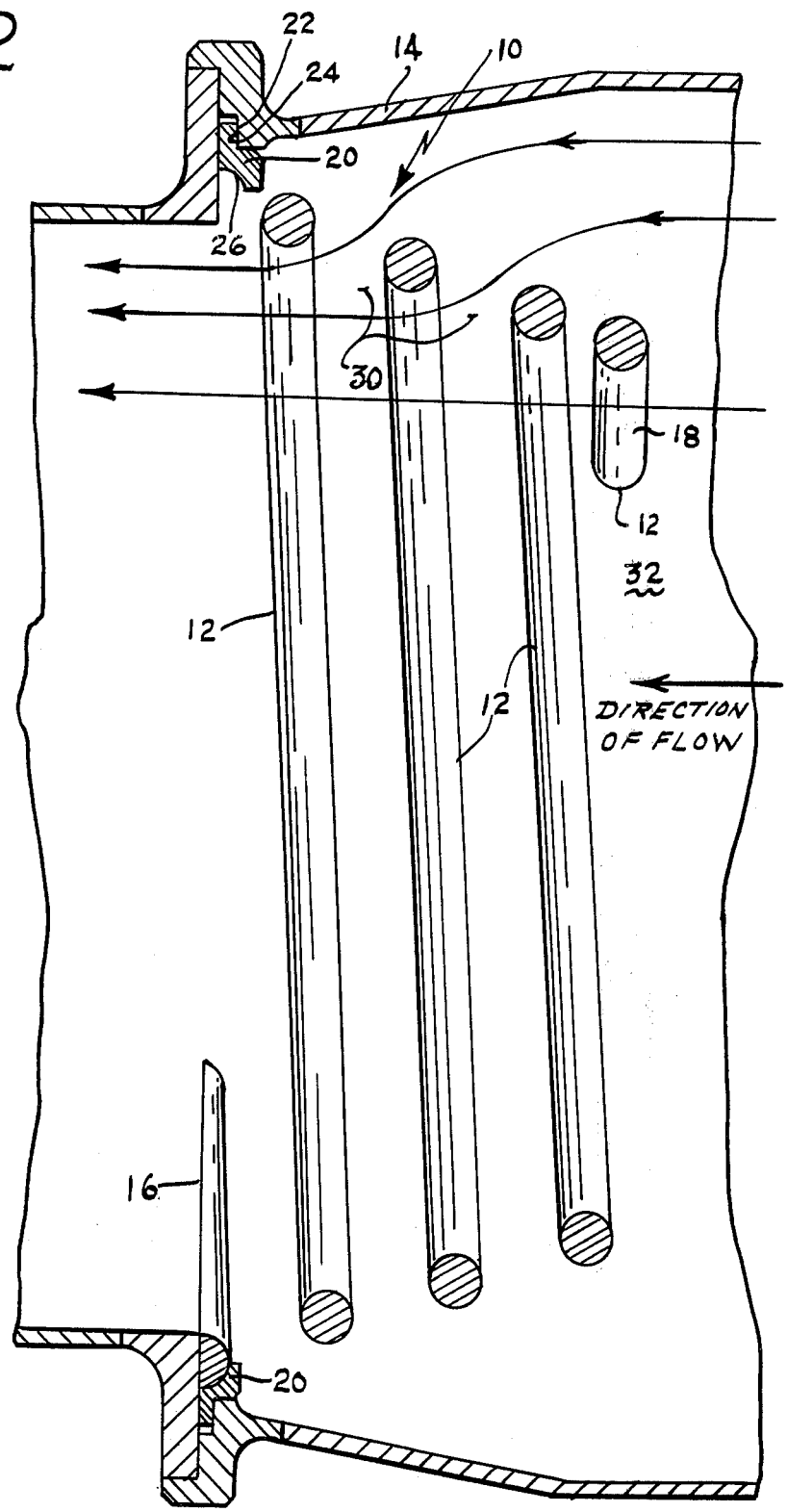
FIG. 2 is a side elevational view of the conical spring regulator valve of this invention showing mean flow area.
Figure 3:
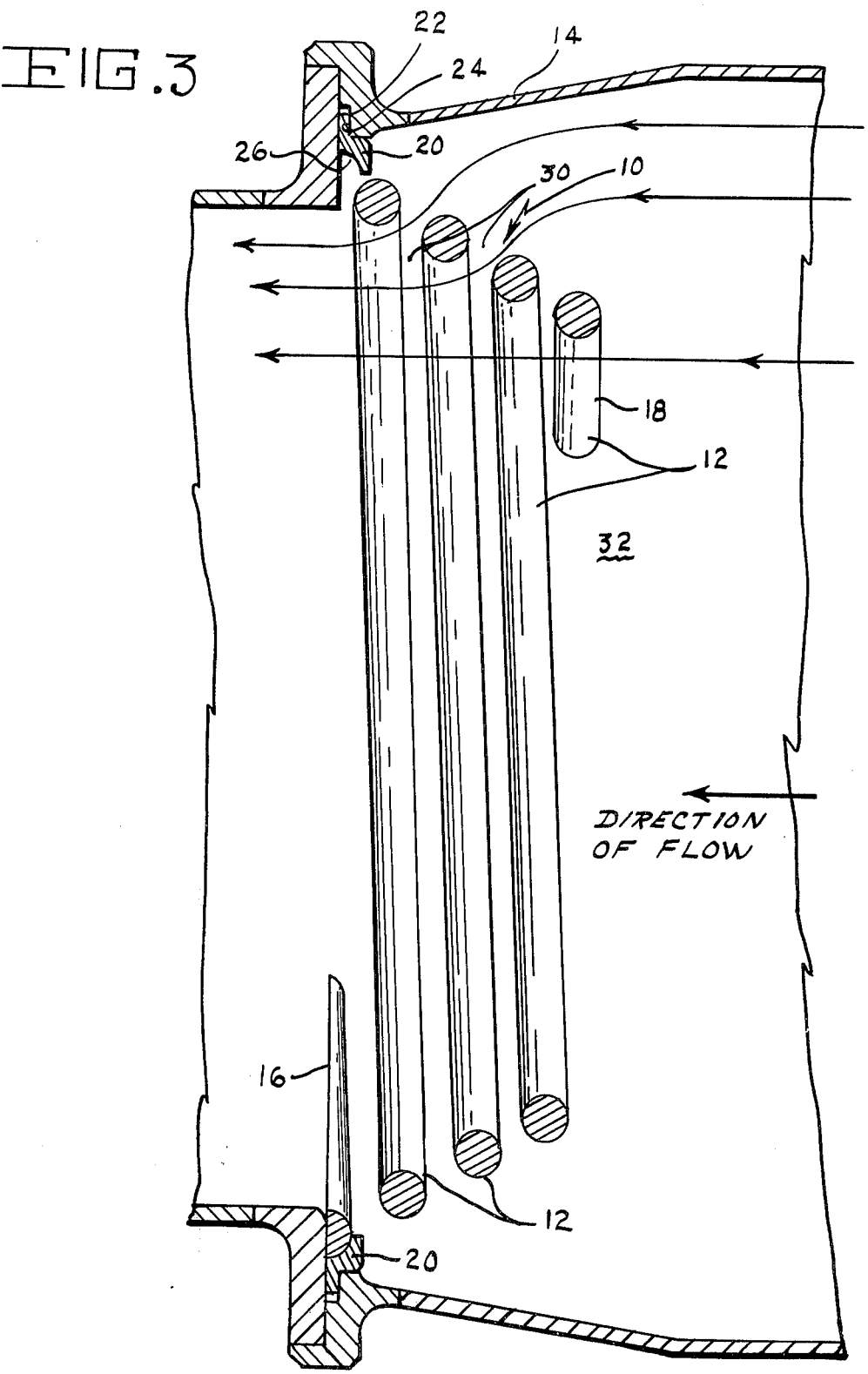
FIG. 3 is a side elevational view of the conical spring regulator valve of this invention showing minimum flow area.
Figure 4:
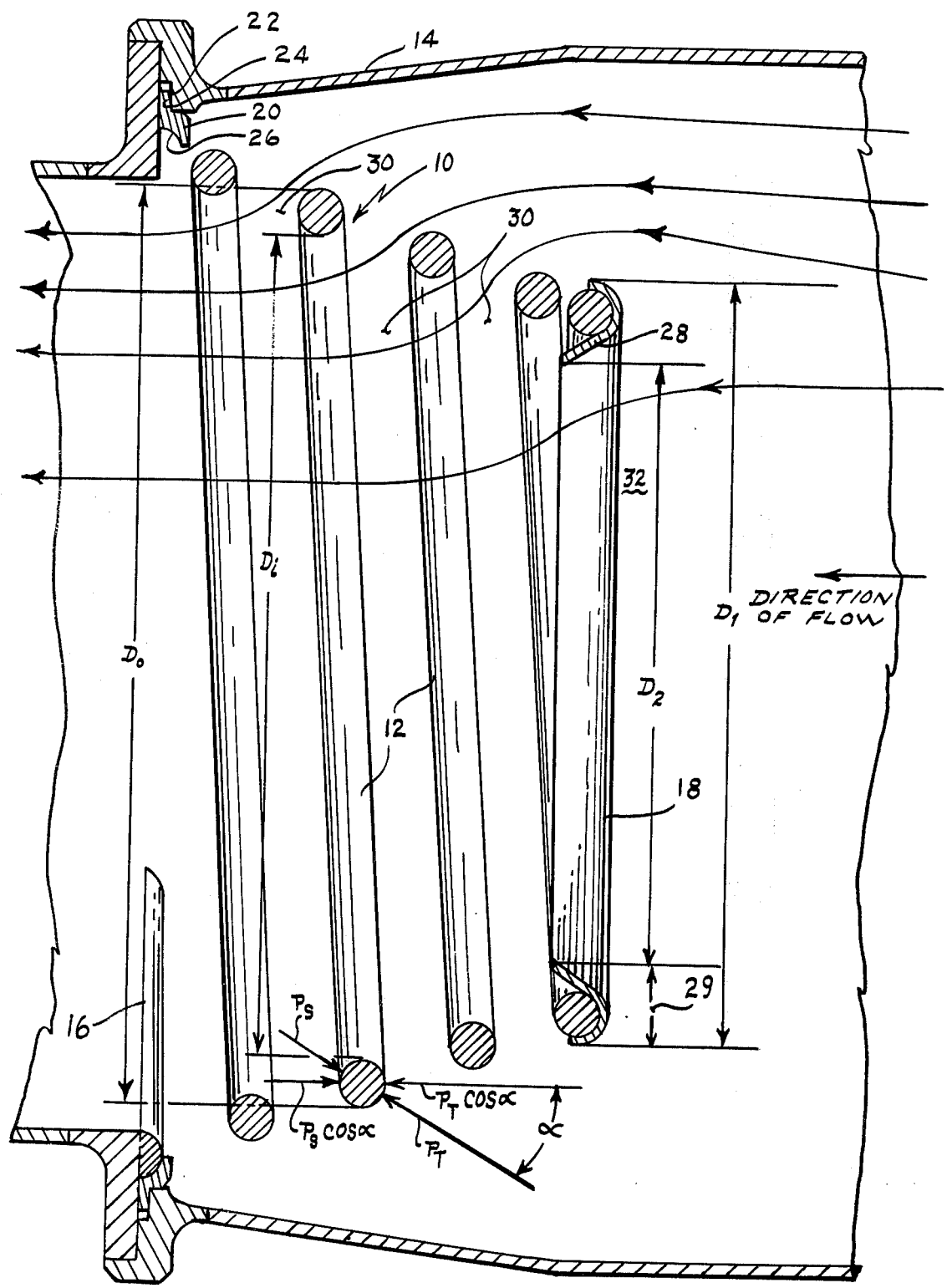
FIG. 4 is a side elevational view of the conical spring regulator valve of this invention having a baffle mounted thereon.

Reference is now made to FIGS. 1–3 of the drawing which best show the pressure sensitive regulating valve 10 of this invention. Valve 10 as shown in FIGS. 1–3 is in the form of a conical spring 12 which is fixedly secured within a conventional conduit 14 within which the fluid flow is to be regulated. In position within conduit 14, spring 12 has its larger end 16 secured to conduit 14 while its smaller end 18 is located at the upstream end of conduit 14.

In order to mount valve 10 within conduit 14 a mounting ring 20 is so designed to engagingly mate an interior surface 22 of conduit 14. Mounting ring 20 is of any suitable exterior configuration 24 so as to mate within conduit 14 while it is formed of a concave interior configuration 26 so as to fixedly secure the larger end 16 of spring 12 in place.

In addition to the utilization of conical spring 12 as shown in FIGS. 1–3, a ring-shaped baffle 28 having a central opening may be removably mounted on the smaller end 18 of valve 10 thereby more accurately defining the pressure area 29 on the end coil 18 of spring 12.

In operation with valve 10 as shown in FIGS. 1–4, flow occurs through variable flow areas 30 (between coils of spring 12) and constant flow area 32 (minimum I.D. ($D_2$) of baffle 28 in FIG. 4 or I.D. of spring 12 shown in FIGS. 1–3, if baffle 28 is omitted). As seen in FIGS. 1–3, these figures represent a maximum flow area, means flow area and minimum flow area, respectively, through valve 10.

When flowing, the axial position of spring 12 is determined by the following condition of equilibrium (see FIG. 4):

$$\pi\left(\frac{D_1^2 - D_2^2}{4}\right)\Delta P + \pi\left(\frac{D_o^2 - D_i^2}{4}\right)(\Delta P \cos\alpha) N = F$$

where:
$\Delta P = P_I - P_S$
$D_1$ and $D_2$ = diameters determining Pressure Area 29.
$D_0$ = Spring 12 mean outside diameter.
$D_i$ = Spring 12 mean inside diameter.
$P \cos \alpha = (P_T - P_S) \cos \alpha = P_T \cos \alpha - P_S \cos \alpha$
where $\alpha$ is the angle of the direction of Flow (at Area 30) with respect to the center line of the spring.
N = Number of active coils in spring 12.
F = Force generated by spring 12.

Figure 5A:
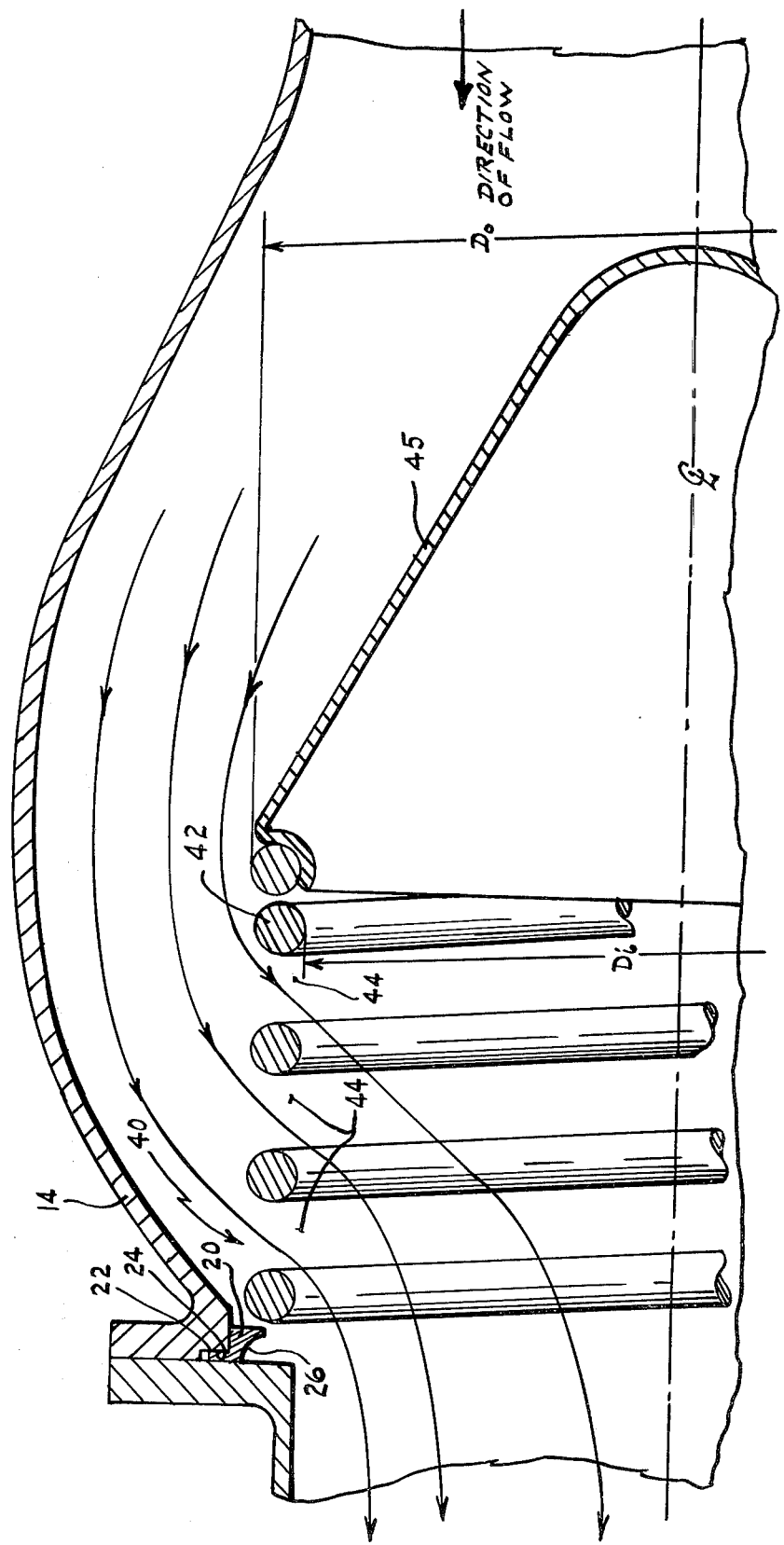
FIGS. 5A and 5B are the top and bottom half, respectively, of a side elevational view showing the helical spring regulator valve of this invention having a baffle mounted thereon.
Figure 5B:
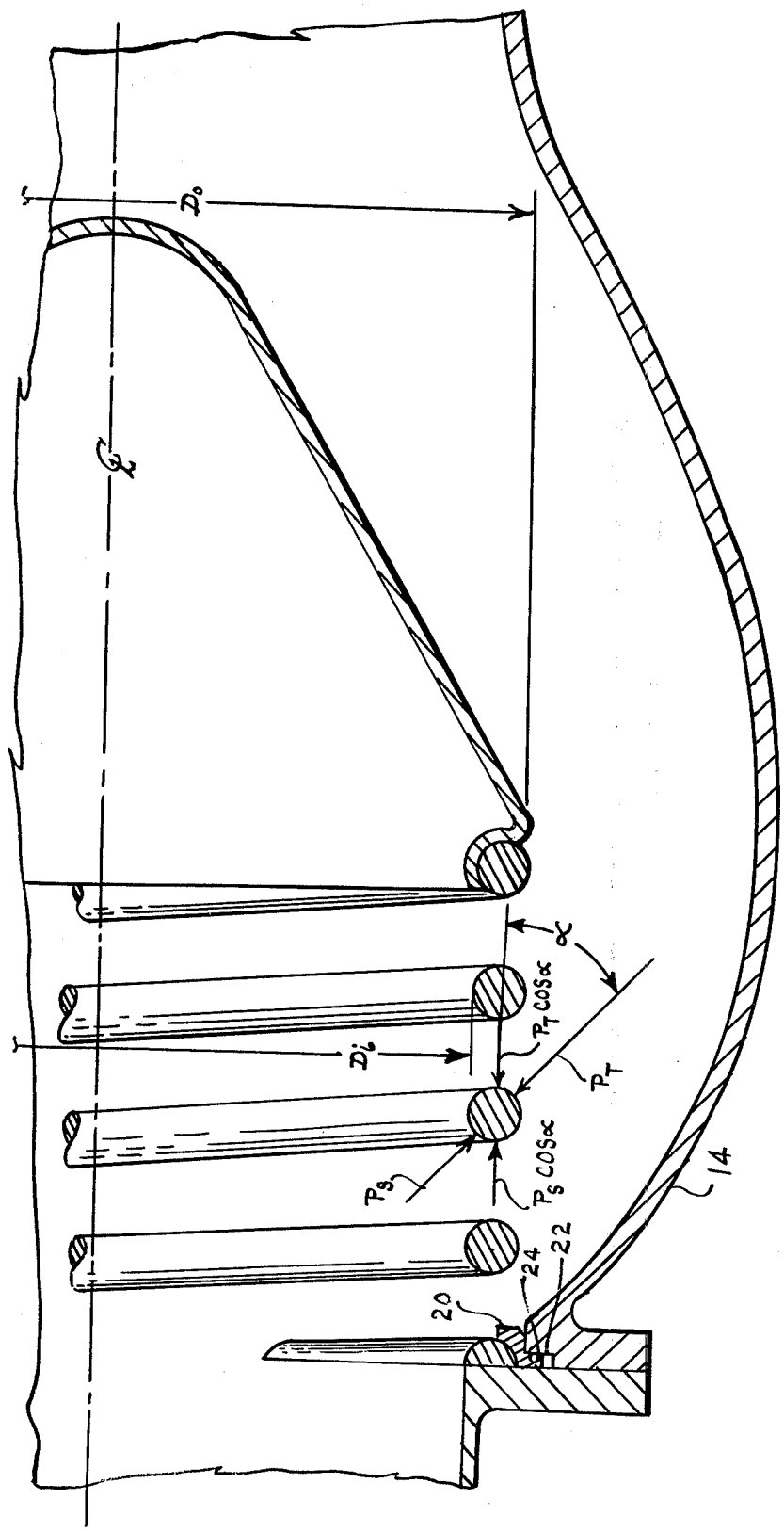

An alternate valve configuration is best shown in the valve 40 of FIGS. 5a and 5b. Valve 40 is in the form of a helical spring 42 which is fixedly secured to mounting ring 20 in the same manner as valve 10 within a conventional conduit 14. In addition to the utilization of helical spring 42 a convexly-shaped solid walled baffle 45 is mounted on upstream end of spring 42 so as to eliminate flow through a constant area and more clearly define the pressure area on end coil of helical spring 42.

In operation with valve 40 as shown in FIGS. 5a and 5b, flow occurs only through variable flow areas 44. When flowing, the axial position of spring 42 is determined by the following condition of equilibrium (see FIG. 5b):

$$\pi\left(\frac{D_o^2}{4}\right)\Delta P + \pi\left(\frac{D_o^2 - D_i^2}{4}\right)(\Delta P \cos\alpha) N = F$$

where:
$\Delta P = P_T - P_S$
$D_0$ = Spring 42 mean outside diameter.
$D_i$ = Spring mean inside diameter.

$P \cos \alpha = (P_T - P_S) \cos \alpha = P_T \cos \alpha - P_S \cos \alpha$
where $\alpha$ is the angle of the direction of flow (at Area 44) with respect to the center line of the spring 42.
N = Number of active coils in spring 42.
F = Force generated by spring 42.

It is therefore clearly evident that any flow variation is reflected immediately also as a $\Delta P$ variation. Accordingly, spring 12 or 42 or valves 10 and 40, respectively, are either compressed or extended until they generate a new force F required to counteract the new $\Delta P$ and to reestablish equilibrium. It is this axial motion that creates the regulating action by varying the flow areas 30 and 44. Thusly, the design characteristics of spring 12 and 42 are of prime importance since they are the sole determining factors of the degree of accuracy of the regulating action of valves 10 and 40 of the instant invention.

Although this invention has been described with reference to particular embodiments it will be understood to those skilled in the art that this invention is also capable of a variety of alternate embodiments within the spirit and scope of the appended claims.

I claim:
1. A pressure sensitive valve for use within a conduit for regulating the flow therethrough, said valve comprising a spring, said spring being secured at one end thereof within said conduit, a baffle mounted on the other end of said spring, said baffle being of ring-shaped configuration having a central opening therethrough and the design characteristics of said spring being governed by the following equation:

$$\pi\left(\frac{P_A}{4}\right)\Delta P + \pi\left(\frac{D_o^2 - D_i^2}{4}\right)(\Delta P \cos \alpha) N = F$$

wherein
$P = P_T - P_S$
$P_A$ = pressure area
$D_0$ = spring mean outside diameter
$D_i$ = spring means inside diameter
$P \cos \alpha = (P_T - P_S) \cos \alpha = P_T \cos \alpha - P_S \cos \alpha$
where $\alpha$ is the angle of the direction of flow with respect to center line of spring.
N = number of active spring coils
F = force generated by spring
whereby said spring expands and contracts under the influence of pressure thereby maintaining said flow through said conduit substantially constant at all times.

2. A pressure sensitive valve for use within a conduit for regulating the flow therethrough as defined in claim 1 further comprising a mounting ring secured within said conduit and said spring being fixedly secured at one end thereof to said mounting ring.

3. A pressure sensitive valve for use within a conduit for regulating the flow therethrough as defined in claim 1 wherein said spring is of a conical configuration.

* * * * *